(12) United States Patent
Sarda et al.

(10) Patent No.: US 10,063,283 B2
(45) Date of Patent: *Aug. 28, 2018

(54) METHOD AND APPARATUS FOR SELECTING AN APPLICATION OF A DEVICE HAVING AN NFC INTERFACE

(71) Applicant: NAGRAVISION S.A., Cheseaux-sur-Lausanne (CH)

(72) Inventors: Pierre Sarda, Echallens (CH); Frederic Thomas, Onex (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/782,129

(22) Filed: Oct. 12, 2017

(65) Prior Publication Data

US 2018/0041252 A1    Feb. 8, 2018

Related U.S. Application Data

(63) Continuation of application No. 15/443,626, filed on Feb. 27, 2017, now Pat. No. 9,806,766, which is a
(Continued)

(51) Int. Cl.
*H04B 5/00* (2006.01)
*H04M 1/725* (2006.01)
(Continued)

(52) U.S. Cl.
CPC ...... *H04B 5/0031* (2013.01); *H04M 1/72519* (2013.01); *H04W 4/008* (2013.01);
(Continued)

(58) Field of Classification Search
CPC ... H04W 4/008; H04W 60/00; H04W 76/023; H04B 5/0031; H04M 1/72519
(Continued)

(56) References Cited

U.S. PATENT DOCUMENTS 8,358,596 B2    1/2013  Byrne et al.
9,621,252 B2 *  4/2017  Sarda ................... H04B 7/15
(Continued)

FOREIGN PATENT DOCUMENTS

WO    WO 2007/112787    10/2007
WO    WO 2012/065643     5/2012

OTHER PUBLICATIONS

U.S. Appl. No. 14/204,341, 2014-0256254, Sep. 11, 2014, Patented U.S. Pat. No. 9,621,252.
(Continued)

Primary Examiner — Eugene Yun
(74) Attorney, Agent, or Firm — DLA Piper LLP (US)

(57) ABSTRACT

The present invention describes a method to select an application on a first device having an NFC interface and comprising a plurality of applications using the NFC interface, said method comprising the steps of detecting a second device having a NFC interface via the NFC interface of the first device, obtaining via the NFC interface a message comprising a message type and a service identification, determining an application type based on the message type and the service identification, selecting at least one application among the plurality of applications matching the message type and the service identification, prompting a user of the first device to accept a communication between the second device and the selected application, in case of positive answer, notifying the selected application of the message type, establishing the communication between the selected application and the second device via the NFC interface.

18 Claims, 1 Drawing Sheet

Related U.S. Application Data continuation of application No. 14/204,341, filed on Mar. 11, 2014, now Pat. No. 9,621,252.

(60) Provisional application No. 61/775,737, filed on Mar. 11, 2013.

(51) Int. Cl.
| | |
|---|---|
| *H04W 60/00* | (2009.01) |
| *H04W 4/00* | (2018.01) |
| *H04W 76/02* | (2009.01) |
| *H04W 76/14* | (2018.01) |
| *H04W 4/80* | (2018.01) |

(52) U.S. Cl.
CPC ............. *H04W 4/80* (2018.02); *H04W 60/00* (2013.01); *H04W 76/023* (2013.01); *H04W 76/14* (2018.02)

(58) Field of Classification Search
USPC ............................................... 455/41.2, 41.1
See application file for complete search history.

(56) References Cited

U.S. PATENT DOCUMENTS

| | | |
|---|---|---|
| 2007/0239981 A1 | 10/2007 | Lessing |
| 2012/0220282 A1 | 8/2012 | Kwon et al. |
| 2012/0270579 A1 | 10/2012 | Seo et al. |
| 2013/0115935 A1 | 5/2013 | Boehler |
| 2014/0035727 A1 | 2/2014 | Nguyen |
| 2014/0053080 A1 | 2/2014 | Lessing |

OTHER PUBLICATIONS

U.S. Appl. No. 15/443,626, 2017-0170877, Jun. 15, 2017, Patented U.S. Pat. No. 9,806,766.
Search Report issued in European Application No. 14158754.3, dated Jan. 29, 2015.
U.S. Appl. No. 14/204,341.
U.S. Appl. No. 15/443,626.

\* cited by examiner

METHOD AND APPARATUS FOR SELECTING AN APPLICATION OF A DEVICE HAVING AN NFC INTERFACE

CROSS REFERENCE TO RELATED APPLICATIONS

This application is a continuation of U.S. patent application Ser. No. 15/443,626 filed Feb. 27, 2017, which is a continuation of U.S. patent application Ser. No. 14/204,341 filed Mar. 11, 2014 (now U.S. Pat. No. 9,621,252 issued Apr. 11, 2017), which claims priority to U.S. Provisional Application No. 61/775,737, filed Mar. 11, 2013, the entire contents of which are hereby incorporated by reference.

INTRODUCTION

Near Field Communication ("NFC") technology is a high frequency wireless communication technology, with a range of the order of a few centimeters, for the exchange of information between multiple devices. This technology is originating from a combination in a single device, of a smart card interface and a contactless reader.

An NFC device is able to communicate with other NFC devices as well as devices in conformance with the ISO 14443 (contactless smart card) standard.

The standards covering the NFC communication protocols and data exchange formats and are based on existing standards for radio frequency identification (RFID), such as ISO/IEC 14443, FeliCa and ISO/IEC 18092. Other NFC standards include standards defined by the "NFC Forum," which was founded in 2004 by Nokia, Philips and Sony and now includes more than 180 members.

NFC is an extension of RFID technology, allowing two-way communication between two devices while previous systems such as contactless smart cards allow only one-way communication.

NFC technology is usable only over a short distance of a few centimeters, which implies a voluntary user and usually prevents use without his knowledge.

NFC devices can be active or passive. A passive device, such as a tag, a smart card or a simple chip affixed to an object contains information only readable by other NFC-enabled devices. The passive device is powered by the electromagnetic field generated by the reader (active device) and therefore does not need its own power supply.

An active device is one that generates an electromagnetic field. The active device can do that to interact with a passive device (see above) or to establish a communication channel with another active device.

The fact that a device like a smartphone has a power supply does not necessarily mean it will work in active mode only. A smartphone can handle the NFC interface in active or passive mode. In passive mode, it is called card emulation. In this mode a smartphone (or any other portable device such as a tablet) will store in a secure memory information normally stored in the card. Thus, when the smartphone detects the electromagnetic field, it can access the secure memory and answer in passive mode NFC mode with the information read from the secure memory.

Among the many known applications using NFC technology are the following:

- payment using a credit card or contactless (mobile phone, smartphone, laptop, tablet computer . . . ) mobile device on a contactless payment terminal;
- payment of parking terminal accepting contactless payment using NFC mobile terminal;
- purchase and validation of a contactless ticket or a ticket to a show with her mobile;
- management of coupons in a store, manage loyalty points at retailers (couponing);
- access and starting a vehicle using his mobile phone;
- Read product information (price, composition, allergy, etc. . . . ) in a store;
- Control access to local OA (meeting room, business, classroom, etc.);
- exchange profiles between two users of a social network or game levels by bringing the two phones (user peer-to-peer);
- reading an electronic business card with a PDA;
- sync Internet bookmarks and contacts between a PDA and a mobile phone;
- recovery key to a WiFi access point approaching its "NFC device" terminal dissemination;
- access to home automation features of a building.

BACKGROUND ART

The generalization of the NFC technology on devices such smartphones, tablets, computers or set-top-boxes opens a high number of applications on these devices, and it is often the case that the same device comprises several applications using the NFC interface. As a consequence, the hardware layer of the device in charge of the communication via the NFC reader must determine to which application, among the plurality of applications loaded into the device, the data acquired through the NFC interface should be communicated.

BRIEF DESCRIPTION OF THE FIGURES

The present invention will be better understood thanks to the attached figures in which.

DETAILED DESCRIPTION

A main device such as a smart phone, a tablet, a computer or a set-top box can embody an NFC reader enabling interaction with secondary NFC devices. We call it a "main device" because it is on that device that the invention is implemented. The "secondary devices" are devices (active or passive) having an NFC interface and comprising data to interact with the main device. These secondary NFC devices can be passive (e.g., bank cards) or active (e.g., smart phones) as discussed above.

These secondary NFC devices contain data of various types, such as payment data for an electronic wallet (passive device), identification data in a control access card (passive device), entrance ticket data in a data carrier (passive device), contact details in a smart phone (active device), audio or video content in a tablet (active device). In general, a passive device is related to one application (banking, ticketing, access control) and the data stored in it are associated with that application. However, even in a passive device, it is possible to have different sets of data associated with different applications. Since the passive device does not contain a power supply, the selection of the application is usually made by a button on the secondary device (for example press 1 to enable to first application, press 2 to enable the second application), or by a selection on the main device during an initialization process.

Figure 2:
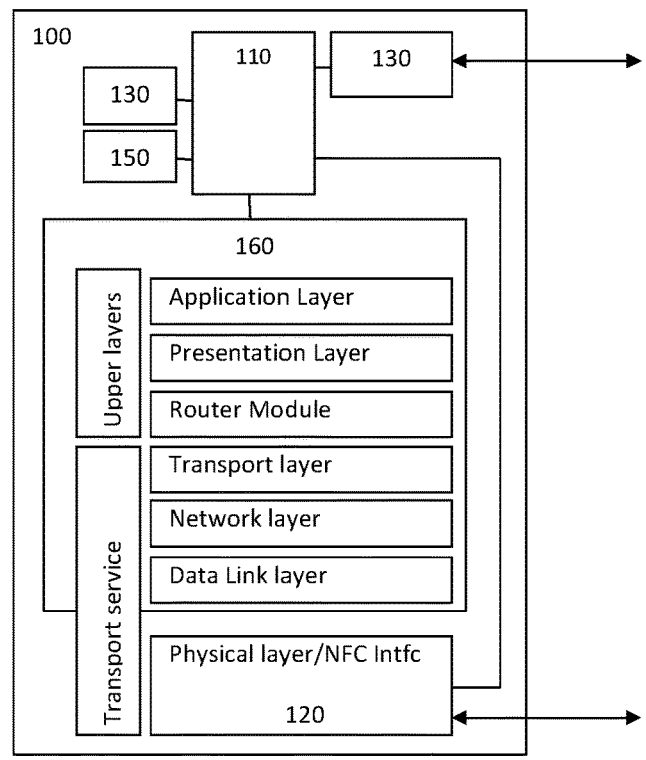
FIG. 2 is a block diagram illustrating a communication device according to one embodiment.

An embodiment of a main device 100 is illustrated in the block diagram of FIG. 2. The main device 100 comprises a processor (which may include one or more physical devices) 110 running an operating system which handles interaction with an NFC communication interface 120 and, optionally, one or more additional communication interfaces (e.g., transceivers) 130 (only a single additional interface 130 is illustrated in FIG. 2, but it should be understood that multiple additional interfaces are possible) such as Wifi, EDGE, 3G, 4G, USB, Bluetooth, Ethernet, etc.) and. The device 100 further includes an output device 140 (e.g., a display or indicator lights) suitable for prompting a user, and an input device 150 suitable for allowing a user to respond to prompts. The main device 100 further includes a memory 160 for storing one or more installed applications. The operating system includes a transport service layer that enables communication by the NFC communications interface 120 using the appropriate protocol. The detection and the response, at the data link layer is also the responsibility of the operating system. Once the message is received and acknowledged, this message is passed to the upper layers.

General Protocol Flow

The real value of NFC however comes not from its technical workings but from the protocols that have been built around it. By setting standards and building layers of abstraction on top of core NFC functionality, smartphone platform vendors can give developers a rich set of interfaces for interacting with the NFC ecosystem.

For example, the leading NFC industry organization, the NFC Forum, has been filling out the NFC family with protocols like NFC Data Exchange Format (NDEF) which allows the storage and communication of binary documents including MIME objects (images PDFs and so on) URLs and other details. NDEF record types specify whether the object is a Smart Poster Text URI Signature Generic Control or a handover control specification with Service Discovery Protocol IP OBEX and SNEP bindings allowing links to other types of objects.

NFC's rapid and ubiquitous communication has made it well-suited for public transportation systems where the ability to quickly read ticket information has made it a staple in countries like Singapore, Japan and the UK. In Europe, the transportation industry has already converged around the interoperable Calypso contactless ticket standard addressing the compatibility issues that plague NFC applications.

Point-of-sale transactions are also possible through NFC with card-based services like Mastercard PayPass eventually likely to allow NFC-equipped mobiles to act as virtual 'wallets' holding banking loyalty program personal preferences and other details. That's obviously a very high-security application, so banks will drive those rollouts at their own speed and using security they're happy with.

Early internal trials at the likes of Westpac and ANZ Bank have had a positive response while the leading mobile-communications industry organization the GSM Association (GSMA) is promoting adoption with its Mobile NFC specification Pay-Buy-Mobile global payments approach and the ISIS specification to provide a single global mechanism for NFC payments.

Now on multi-application devices, it is possible to run on the same device various different programs, each of which being willing to read or write data to an external NFC device. This is why a main device, comprising a plurality of NFC compatible applications, comprises an operating system that handles the physical layers of the NFC communication interface 120.

The next higher level of the NFC protocol stack defines different message formats. A popular format is the NFC Data Exchange Format (NDEF) defined by the NFC forum. The format defines a general message structure and comprises the application identification allowing devices to identify what kind of information is contained in the message it has received. The following list gives some examples of message types that can be encoded in an NDEF message:

URI (web address, email address)
Plain text
Smart poster=text+uri
Bluetooth and Wi-Fi parameters
Business card (vCard format)
Signature Once an NDEF message has been received, a content dispatching system forwards the content of the message to an application that has registered itself for receiving these messages.

This way, different applications can register themselves for different message types and the dispatching system automatically forwards the message to the application that can handle the particular message type. When several applications register themselves for the same message type a dialogue box is usually presented to the user to choose which application should receive the message. When a web address has been received for example, it could be sent to the web browser while an NDEF message containing a vCard would trigger the address book application that has previously registered itself as a receiver for this kind of content.

Applications on a mobile device can not only receive NFC messages but also transmit them. The address book application for example can be extended to send NFC messages, e.g., to send an address book entry to the next NFC-enabled device that comes in range.

Embodiments of the present invention add or update the layer between the physical layers (i.e., the NFC communication interface 120) and the application layer by a router module that intercepts all messages received from the NFC interface. The function of the router module is twofold: the first function is to route the messages to the right application, and the second function is to prompt the user of such an operation. This router module comprises a table in which, for each message type, at least one application may be listed. When an application is installed on the main device, this table is updated with the application identifier and the type of messages handled by this application. As a consequence, for one message type, it is possible to have several application identifiers.

During the initialization process of the router module, the user can modify the prompt and select a particular icon per application.

| Type | S_ID | Application | Icon |
| --- | --- | --- | --- |
| URI | ID_m | App1 | Imag_1.gif |
|  | ID_n | App2 | Imag_2.gif |
| vCard | ID_p | App3 | Imag_3.gif |
| Text |  | App4 | Imag_4.gif |
| Signature |  |  |  |

This table illustrates the configuration of the handling of the different message types. In addition to the message type, the physical layers of the NFC interface can obtain a service identification S_ID from the second device D2. This identification will help to define which application should be connected to the received messages. After the installation of an application, the router module is notified and informed about which message type is handled by this application. In case that an application App1 is using data of the URI type, the table will contain the App1 in the column of the possible application. The user can add a particular icon (Imag_1.gif), selected from the icon proposed by the application or from the images stored into the main device.

In this specific case, another application App2 is also using data type URI and is listed as well in the table. This application App2 is associated with another icon Imag_2.gif.

According to the invention, the link between the message type and the application is further limited to a service identification. In case that the message type is received and this table contains a service identification, the link between the NFC interface and the application is limited to the second device matching the service identification stored in the table. It is then possible, for the same message type to select different applications among the applications able to deal with this type of messages. The service identification of the second device identification can be a generic identification describing a particular service. For example, for the payment with NFC card, the main device can play the role of a banking card and be used for such transactions. The service identification of a point of sale (second device) can be the identification of the MasterCard service. So that all terminals will give the same identification and the same is stored into the table for connecting the entered message with the banking application stored into the main device. Another example is the QR code. The message type is "image" and the service identification is "QR Code". The router module, thanks to this information, can link the entered messages with the application storing the QR code.

In this table, we have three cases. In the first case (the first row), two (or more) application are willing to use the data of a certain type. The service ID is used to select to correct application. The second case (the second and third rows of the table) is a one to one matching, one application for one message type. The last case (the fourth row of the table) is the absence of application handling this message type.

Figure 1:
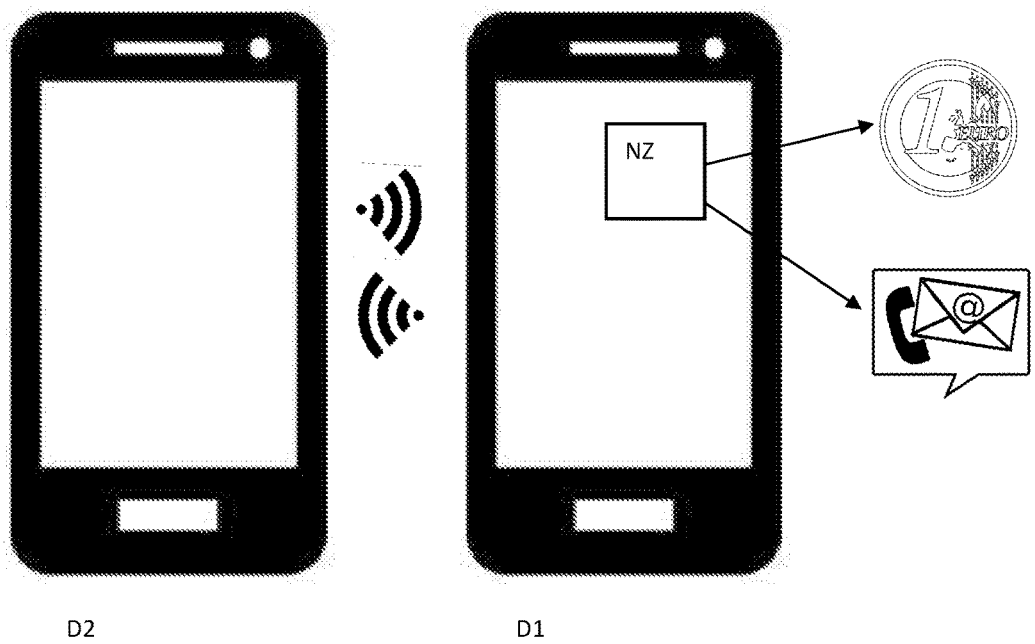
FIG. 1 is diagram illustrating a communication between two devices.

FIG. 1 illustrates the case when a second device D2 is in close contact with a first device D1 and the NFC communication is initiated. The physical layers of the first device D1 handle the NFC protocol and as a result, a message having a message type and a service identification is passed to the router module. The latter determines, based on the table, which application is associated with the message type.

The router module prompts the user in a notification zone NZ using the icon associated with the application selected. In a simple case, one icon is displayed and the router module holds the transfer of the message until the user has acknowledged the launch of the application. In the FIG. 1, a case is illustrated with the Euro sign meaning that a financial transaction is involved. The user has the option to grant the access to the application related to the financial transaction or deny it. Once granted, the message is passed to the selected application and the financial transaction can take place.

This is also a protection in that a message coming through an NFC interface is not automatically processed without the user's approval.

In the case that two (or more) applications are willing to use one message type and the service identification is empty in the table, the icon of the two applications will be displayed on the output device 140 (e.g., a smart phone display) and the user can choose one of them or deny any transaction via the input device 150 (which may be, for example, combined with the output device in the form of a touch screen). The service identification is then updated into the table so that future messages of this type of service are associated with this application.

In the case that no application is referenced with a particular message type (for example the signature message type in the above table), the main device can a request the user's action to link this message type and service identification with an already installed application. When a selection is made by the user, the table is updated and the next time that the same message type/service identification is received, the selected application will be proposed.

Alternatively, a request can be sent to a server proposing applications compatible with this message type. The request contains the message type and the server can list the applications compatible to the message type and send this list to the first device.

The router module, receiving this list, can check if one of the applications already installed is compatible with this message type. In the positive event, the router module prompts the user and requests the approval to associate and use the message received by the NFC interface with this application. In the negative event, the router module displays the list to propose to the user to download and install the application able to handle the message type not supported by the applications installed in the main device.

In case the user accepts one of the applications, the latter is downloaded into the main device and installed. Furthermore, the user is invited to add an icon to illustrate the application freshly installed. The table is updated accordingly.

The invention claimed is:

1. A method for selecting an application on a first device having a wireless communications interface and comprising a plurality of installed applications capable of receiving and/or transmitting wireless messages, said method comprising the steps of:
   detecting, using the wireless communications interface of the first device, a second device having a wireless communications interface;
   obtaining, using the wireless communications interface of the first device, a message comprising a message type and a service identification;
   determining if an application on the first device is registered for the message type, and if it is determined that an application on the first device is registered for the message type, establishing communication between the registered application and the second device via the wireless communications interface of the first device, and if an application is not registered for the message type:
     selecting at least one application matching the message type and the service identification from among the plurality of installed applications on the first device;
     displaying a prompt to accept a communication between the second device and the selected application;
     inputting a selection indicating that the communication between the second device and the selected application has been accepted;
     establishing the communication between the selected application and the second device via the wireless communications interface of the first device; and
     registering, on the first device, the selected application with the message type.

2. The method of claim 1, wherein the wireless communications interface of the first device and the wireless communications interface of the second device comprise an NFC interface.

3. The method of claim 2, wherein the first and second devices each comprise a second communication interface and said method further comprises exchanging data between the first and second devices using the second communication interface.

4. The method of claim 1, wherein the first device comprises a router module configured to receive and route wireless messages to one or more of the installed applications, said router module comprising a table linking, for one message type and one service identification, at least one application and one icon, wherein said step of selecting at least one application matching the message type and the service identification is performed by the router module using the table.

5. The method of the claim 4, wherein if the table does not contain a service identification for the received message type, the router module displays a prompt with one or more icons representing each application matching said message type.

6. The method of claim 4, wherein, when an application is installed on the first device, the router module updates the table to associate the application with the message type handled by the application.

7. The method of the claim 1, wherein when it is determined that no application matches the message type, said method further comprises:
sending by the first device, to a server, a request containing the message type;
receiving at the first device a list of applications matching the message type from the server;
determining by the first device if an installed application of the plurality of installed applications is listed on the list; and
displaying a prompt to accept a communication between the second device and the installed application when an installed application is listed on the list.

8. The method of claim 7, further comprising displaying a prompt to download and install one of the listed applications when none of the applications listed on the list are installed on the first device.

9. A main device comprising:
a processor;
a memory connected to the processor for storing a plurality of installed applications;
a wireless communications interface connected to the processor;
an input device connected to the processor; and
an output device connected to the processor;
wherein the processor is configured to
detect, using the wireless communications interface of the main device, a second device having a wireless communications interface;
obtain, using the wireless communications interface of the main device, a message comprising a message type and a service identification;
determine if an application on the main device is registered for the message type, and if it is determined that an application on the main device is registered for the message type, establishing communication between the registered application and the second device via the wireless communications interface of the main device, and if an application is not registered for the message type:
select at least one application matching the message type and the service identification from among the plurality of installed applications on the main device;
display a prompt to accept a communication between the second device and the selected application;
input a selection indicating that the communication between the second device and the selected application has been accepted;
establish the communication between the selected application and the second device via the wireless communications interface of the main device; and
register, on the main device, the selected application with the message type.

10. The main device of claim 9, wherein the wireless communications interface of the first device and the wireless communications interface of the second device comprise an NFC interface.

11. The main device of claim 10, wherein the first and second devices each comprise a second communication interface and said processor is configured to exchange data with the second device using the second communication interface.

12. The main device of claim 9, wherein the processor is configured to:
display a prompt of all selected applications when more than one application is selected, and
store the selected application for future selection.

13. The main device of claim 9, wherein when it is determined that no application matches the message type, the processor is configured to:
send to a server a request containing the message type;
receive a list of applications matching the message type from the server; and
determine if an installed application of the plurality of installed applications is listed on the list.

14. The main device of claim 13, wherein the processor is configured to display a prompt to accept a communication between the second device and the installed application when an installed application is listed on the list.

15. The main device of claim 13, wherein the processor is configured to display a prompt to download and install one of the listed applications when none of the applications listed on the list are installed on the first device.

16. The main device of claim 9, wherein the processor is configured to execute a router module configured to receive and route wireless messages to one or more of the installed applications, said router module comprising a table linking, for one message type and one service identification, at least one application and one icon, wherein selecting at least one application matching the message type and the service identification is performed by the router module using the table.

17. The main device of the claim 16, wherein if the table does not contain a service identification for the received message type, the router module displays a prompt with one or more icons representing each application matching said message type.

18. The main device of the claim 16, wherein, when an application is installed on the first device, the router module updates the table to associate the application with the message type handled by the application.

* * * * *